(12) United States Patent
Onishi et al.

(10) Patent No.: US 8,144,449 B2
(45) Date of Patent: Mar. 27, 2012

(54) ELECTRONIC COMPONENT AND ELECTRONIC COMPONENT BUILT-IN SUBSTRATE

(75) Inventors: Kosuke Onishi, Echizen (JP); Yukio Sanada, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 260 days.

(21) Appl. No.: 12/621,655

(22) Filed: Nov. 19, 2009

(65) Prior Publication Data
US 2010/0128411 A1 May 27, 2010

(30) Foreign Application Priority Data
Nov. 27, 2008 (JP) ................. 2008-302073

(51) Int. Cl.
H01G 5/16 (2006.01)
H01G 4/005 (2006.01)
H01G 5/01 (2006.01)
H01G 4/35 (2006.01)

(52) U.S. Cl. ......... 361/290; 361/303; 361/278; 361/302

(58) Field of Classification Search ......... 361/303, 361/278, 290, 302
See application file for complete search history.

(56) References Cited

U.S. PATENT DOCUMENTS

| 5,894,401 A | 4/1999 | Asakura et al. |
| 6,191,932 B1 * | 2/2001 | Kuroda et al. ........... 361/303 |
| 6,288,887 B1 * | 9/2001 | Yoshida et al. ........ 361/306.1 |
| 6,958,899 B2 * | 10/2005 | Togashi et al. ........... 361/303 |

FOREIGN PATENT DOCUMENTS

| JP | 10-064754 A | 3/1998 |
| JP | 2002-198229 A | 7/2002 |
| JP | 2003-309373 A | 10/2003 |
| JP | 2004-200201 A | 7/2004 |

* cited by examiner

Primary Examiner — Jayprakash N Gandhi
Assistant Examiner — Arun Ramaswamy
(74) Attorney, Agent, or Firm — Keating & Bennett, LLP

(57) ABSTRACT

An electronic component includes an electronic component main body including opposed first and second main surfaces, opposed first and second side surfaces, and opposed first and second end surfaces and also includes first and second external terminal electrodes disposed on the first main surface. The first and second external terminal electrodes are spaced apart by a gap region. When a dimension in a longitudinal direction being a direction linking the first and second end surfaces of the electronic component main body is L, a dimension in a width direction being a direction linking the first and second side surfaces is W, and a dimension of the gap region along the longitudinal direction is g, $W<L-g<2W$ and $L-g+W-\{2(L-g)W\}^{1/2}>(L-g)/2$ are satisfied.

18 Claims, 12 Drawing Sheets

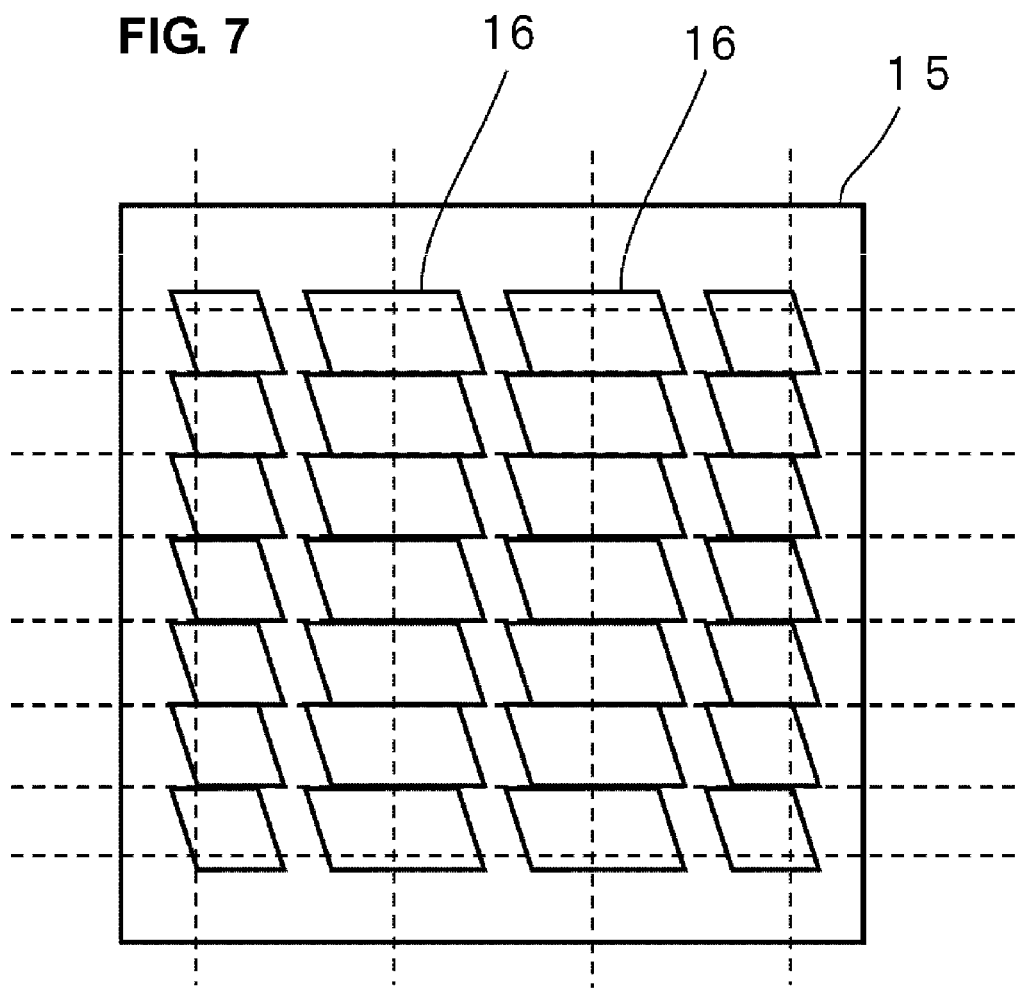

ELECTRONIC COMPONENT AND ELECTRONIC COMPONENT BUILT-IN SUBSTRATE

BACKGROUND OF THE INVENTION

1. Field of the Invention

The present invention relates to an electronic component, such as a multilayer ceramic capacitor, and to an electronic component built-in substrate. More specifically, the present invention relates to an electronic component that includes an outer surface on which a plurality of external terminal electrodes is provided and to an electronic component built-in substrate having a portion electrically connected to the external terminal electrodes.

2. Description of the Related Art

Various electronic devices, including mobile phones and portable music players, are becoming smaller and thinner through the years. In keeping with the trend, wiring substrates mounted on electronic devices and electronic components mounted on wiring substrates are also becoming smaller, and additionally, denser. To advance further miniaturization, an electronic component built-in substrate is being developed.

In an electronic component built-in substrate, an electronic component is embedded in a wiring substrate in advance. It is necessary to electrically connect an embedded electronic component to wiring of a wiring substrate. There are many ways for such electrical connection.

One example of an electrical connection method is described in Japanese Unexamined Patent Application Publication No. 2003-309373. First, an electronic component is embedded in a wiring substrate. Then, a via hole is formed by radiation of a laser beam from the wiring substrate while being aimed at an external terminal electrode of the internal electronic component. The inside of the via hole is filled with a conductive material to electrically connect the wiring of the wiring substrate and the external terminal electrode.

FIG. 12 is a schematic plan view for use in describing a known via-hole formation method using a laser beam. Here, only a top surface of an electronic component embedded in a wiring substrate is illustrated. An electronic component 101 illustrated in FIG. 12 includes a first external terminal electrode 102 and a second external terminal electrode 103 formed on a top surface 101a. A wiring substrate portion lies in the neighboring regions of the electronic component 101.

The first and second external terminal electrodes 102 and 103 are covered with a substrate layer of the wiring substrate. With the electrical connection method described in the above patent document, a laser beam is emitted from the substrate side to form a via hole for use in exposing the first external terminal electrode 102 or a via hole for use in exposing the second external terminal electrode 103. The external terminal electrodes 102 and 103 are made from a metallic plating film that reflects a laser beam, for example, a copper plating film. If an outer surface of the electronic component 101 other than a portion where the external terminal electrodes 102 and 103 are formed, for example, an outer surface in a gap region G between the external terminal electrodes 102 and 103, is radiated with a laser beam, the electronic component 101 is damaged.

As illustrated in FIG. 12, to radiate each of the external terminal electrodes 102 and 103 with a laser beam, it is necessary to avoid the radiation region of the laser beam from reaching the gap region G. A laser beam has straightness. When the external terminal electrodes 102 and 103 are radiated with a laser beam such that the laser beam is substantially perpendicular to the external terminal electrodes 102 and 103, the radiation region is substantially circular. Accordingly, as illustrated in FIG. 12, each of the regions A indicated by the broken lines in contact with the gap region G is the maximum permissible laser radiation region. In other words, it is necessary to emit a laser beam so as to fall within the substantially circular region indicated by the broken line.

The diameter of the substantially circular region indicated by the broken line is $(L-g)/2$, where L is the dimension of the electronic component 101 in the longitudinal direction and g is the dimension thereof in the width direction, and this value is the upper limit. Because of this, with the known electronic component 101, it is necessary to precisely emit a laser beam for use in forming a via hole, so tolerance for control of the position of the radiation region is low.

SUMMARY OF THE INVENTION

Accordingly, preferred embodiments of the present invention provide an electronic component that allows a surface of an external terminal electrode to be radiated with a laser beam such that an undesired outer surface other than the external terminal electrode surface is reliably prevented from being radiated with the laser beam and also provide an electronic component built-in substrate in which the electronic component is embedded. The electronic component built-in substrate allows a via-hole conductor reaching the external terminal electrode of the electronic component to be formed easily and precisely.

According to a preferred embodiment of the present invention, an electronic component includes an electronic component main body including opposed first and second main surfaces, opposed first and second side surfaces, and opposed first and second end surfaces, a first external terminal electrode disposed on the first main surface of the electronic component main body, and a second external terminal electrode disposed on the first main surface of the electronic component main body, the first external terminal electrode and the second external terminal electrode being spaced apart with a predetermined gap region disposed therebetween. Each of the first external terminal electrode and the second external terminal electrode has a substantially trapezoidal shape having an upper base, a lower base, an oblique side facing the gap region on the first main surface. The oblique side facing the gap region of the first external terminal electrode and the oblique side facing the gap region of the second external terminal electrode are substantially parallel with each other. When a dimension in a longitudinal direction being a direction linking the first and second end surfaces of the electronic component main body is L, a dimension in a width direction being a direction linking the first and second side surfaces is W, and a dimension of the gap region along the longitudinal direction is g, $W<L-g<2W$ and $L-g+W-\{2(L-g)W\}^{1/2}>(L-g)/2$ are satisfied.

According to a specific aspect of preferred embodiments of the present invention, the upper base and the lower base of the substantially trapezoidal shape of each of the first and second external terminal electrodes on the first main surface may extend in an edge between the first main surface and the first side surface and an edge between the first main surface and the second side surface, respectively, and a remaining side of the substantially trapezoidal shape other than the upper base, the lower base, and the oblique side facing the gap region may extend in an edge between the first main surface and one of the first and second end surfaces. In this case, the first and second external terminal electrodes each having a substantially trapezoidal shape cover the first main surface of the electronic component other than the gap region. Accordingly, the surface of the electronic component main body can be reliably protected from damage caused by radiation of a laser beam.

According to another specific aspect of preferred embodiments of the present invention, the electronic component may further include an internal electrode disposed within the electronic component main body and electrically connected to at least one of the first external terminal electrode and the second external terminal electrode. Therefore, the electronic component according to preferred embodiments of the present invention may also be a multilayer electronic component having an internal electrode.

According to a more limited specific aspect of preferred embodiments of the present invention, the internal electrode may include a first internal electrode connected to the first external terminal electrode and a second internal electrode connected to the second external terminal electrode. In this case, an electronic component that allows resistance between the first and second internal electrodes, capacitance, and inductance to be extracted can be provided in accordance with preferred embodiments of the present invention.

According to still another specific aspect of preferred embodiments of the present invention, the electronic component may further include a first connection conductor arranged to electrically connect the first internal electrode and the first external terminal electrode and a second connection conductor arranged to electrically connect the second internal electrode and the second external terminal electrode. The form of each of the first and second connection conductors is not limited to a specific one. Each of the first and second connection conductors may be a via-hole conductor and a connection electrode passing through the first and second end surfaces of the electronic component.

According to yet another specific aspect of preferred embodiments of the present invention, the first and second external terminal electrodes may also be disposed on the second main surface of the electronic component main body, and a portion of the first and second external terminal electrodes on the second main surface may have substantially the same shape as that on the first main surface. In this case, the portion of the first and second external terminal electrodes on the second main surface of the electronic component main body has substantially the same shape as on the first main surface. Accordingly, in a state where the electronic component is embedded in the substrate, a via hole can be precisely formed by radiation of a laser beam from outside the substrate.

According to another specific aspect of preferred embodiments of the present invention, each of the first and second external terminal electrodes may not have the substantially trapezoidal shaped electrode portion on the second main surface of the electronic component main body, and the substantially trapezoidal shaped electrode portion may be disposed on only the first main surface. The substantially trapezoidal shaped portion of each of the first and second external terminal electrodes may also be disposed on only the first main surface. In this case, a laser beam can be emitted from outside the surface of the substrate in which the electronic component is embedded. With this configuration, because the electrode portion of the substantially trapezoidal shape of each of the first and second external terminal electrodes is not disposed on the second main surface, the thickness can be reduced.

According to preferred embodiments of the present invention, an electronic component built-in substrate includes an electronic component according to preferred embodiments of the present invention and a substrate including a first main surface and a second main surface opposing the first main surface, the electronic component being accommodated in the substrate. The substrate includes a hole extending from one of the first main surface and the second main surface along a thickness direction linking the first and second main surfaces of the substrate. The hole is disposed such that at least one of the first and second external terminal electrodes of the electronic component is exposed. The substrate further includes a via-hole conductor reaching the hole from one of the first and second main surfaces of the substrate, the via-hole conductor being electrically connected to at least one of the first and second external terminal electrodes.

In the electronic component built-in substrate according to preferred embodiments of the present invention, the electronic component is accommodated in the substrate. Accordingly, a hole can be formed readily and precisely by radiation of a laser beam from the first main surface or the second main surface of the substrate. Hence, a highly reliable via-hole conductor can be formed, and the electronic component main body is less prone to being damaged by incorrect radiation of a laser beam.

With the electronic component according to preferred embodiments of the present invention, each of the first and second external terminal electrodes preferably has a substantially trapezoidal shape on the first main surface of the electronic component main body, and $W<L-g<2W$ and $L-g+W-\{2(L-g)W\}^{1/2}>(L-g)/2$ are satisfied. Accordingly, a laser beam does not easily exceed the first and second external terminal electrodes and reach the gap region during emission of the laser beam toward the first and second external terminal electrodes. That is, the substantially circular shape of a laser beam used in radiation can have a large maximum diameter, so tolerance in radiation of a laser beam can be increased.

Accordingly, tolerance for a radiation position of a lower base in forming a via hole by radiation of the laser beam from outside a substrate in which an electronic component according to preferred embodiments of the present invention is accommodated. If a laser beam having a larger diameter is used, the contact area between the conductive material with which the via hole is filled and the external terminal electrode can be increased. Therefore, reliability of electrical connection can be increased, and the equivalent series resistance (ESR) can also be reduced.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 7 is a schematic plan view that illustrates a mother laminated structure prepared for acquisition of the multilayer ceramic capacitor according to the first preferred embodiment of the present invention.

DETAILED DESCRIPTION OF THE PREFERRED EMBODIMENTS

The present invention is made apparent by the following description of specific preferred embodiments of the present invention with reference to the attached drawings.

Figure 1A:
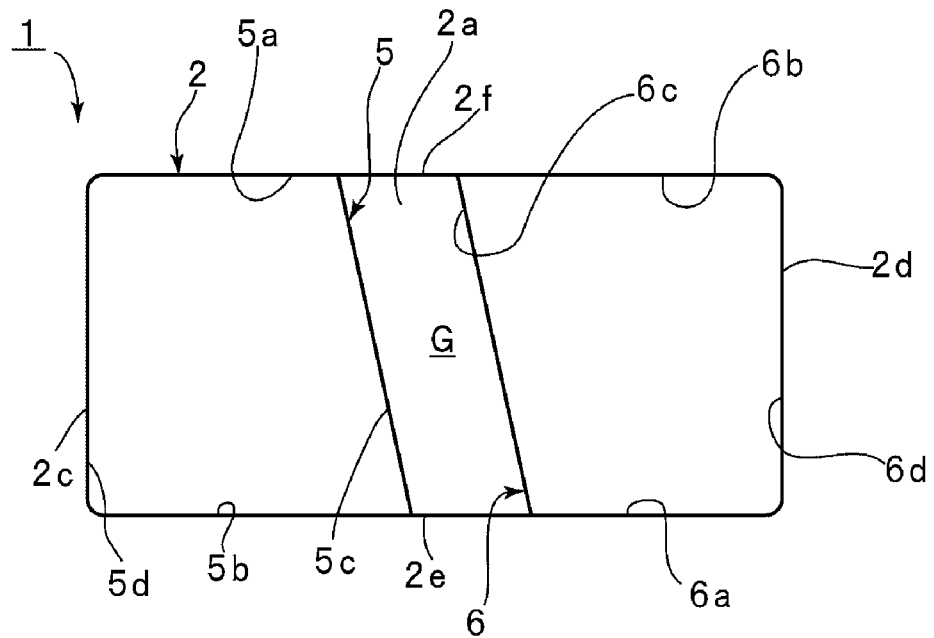
FIG. 1A is a plan view of an electronic component according to a first preferred embodiment of the present invention.
Figure 1B:
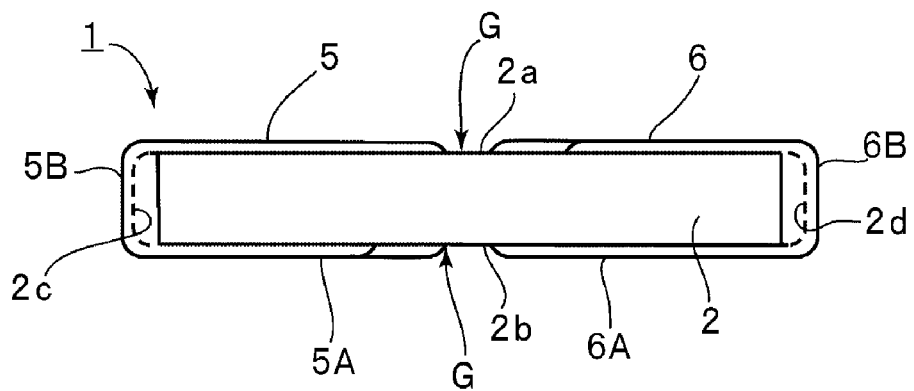
FIG. 1B is a front view thereof.
Figure 1C:
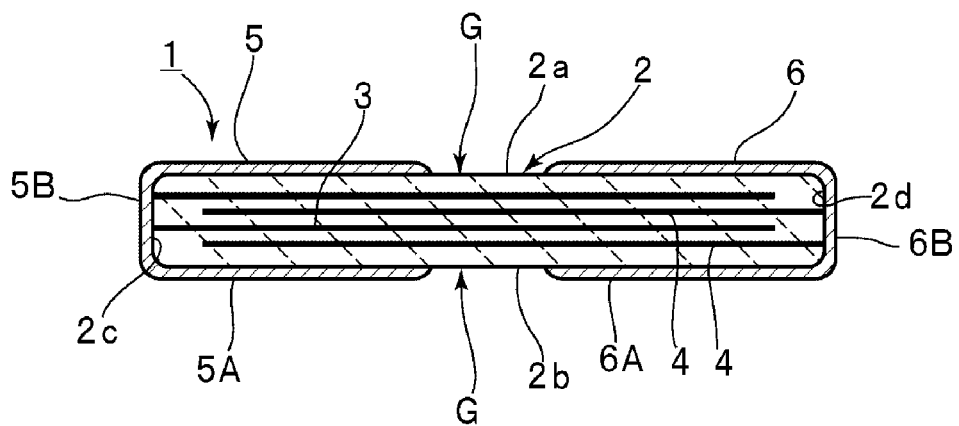
FIG. 1C is a front cross-sectional view thereof.

FIG. 1A is a plan view of a multilayer ceramic capacitor as an electronic component according to a first preferred embodiment of the present invention; FIG. 1B is a front view thereof; and FIG. 1C is a front cross-sectional view thereof.

A multilayer ceramic capacitor 1 includes a ceramic sinter 2 as an electronic component main body. The ceramic sinter 2 has a substantially rectangular parallelepiped shape and includes a first main surface $2a$, a second main surface $2b$ opposing the first main surface $2a$, a first end surface $2c$, a second end surface $2d$, and first and second side surfaces $2e$ and $2f$ opposing each other. In the ceramic sinter 2, a direction that links the first and second end surfaces $2c$ and $2d$ is referred to as a longitudinal direction; a direction that links the first and second side surfaces $2e$ and $2f$ is referred to as a width direction; and a direction that links the first and second main surfaces $2a$ and $2b$ is referred to as a thickness direction.

Within the ceramic sinter 2, a plurality of first internal electrodes 3 and a plurality of second internal electrodes 4 are alternately arranged in the thickness direction of the ceramic sinter 2. As illustrated in FIG. 1C, the plurality of first internal electrodes 3 extends to the first end surface $2c$, and the plurality of second internal electrodes 4 extends to the second end surface $2d$. The first internal electrodes 3 and the second internal electrodes 4 are arranged so as to overlap one another through a ceramic layer.

Figure 2:
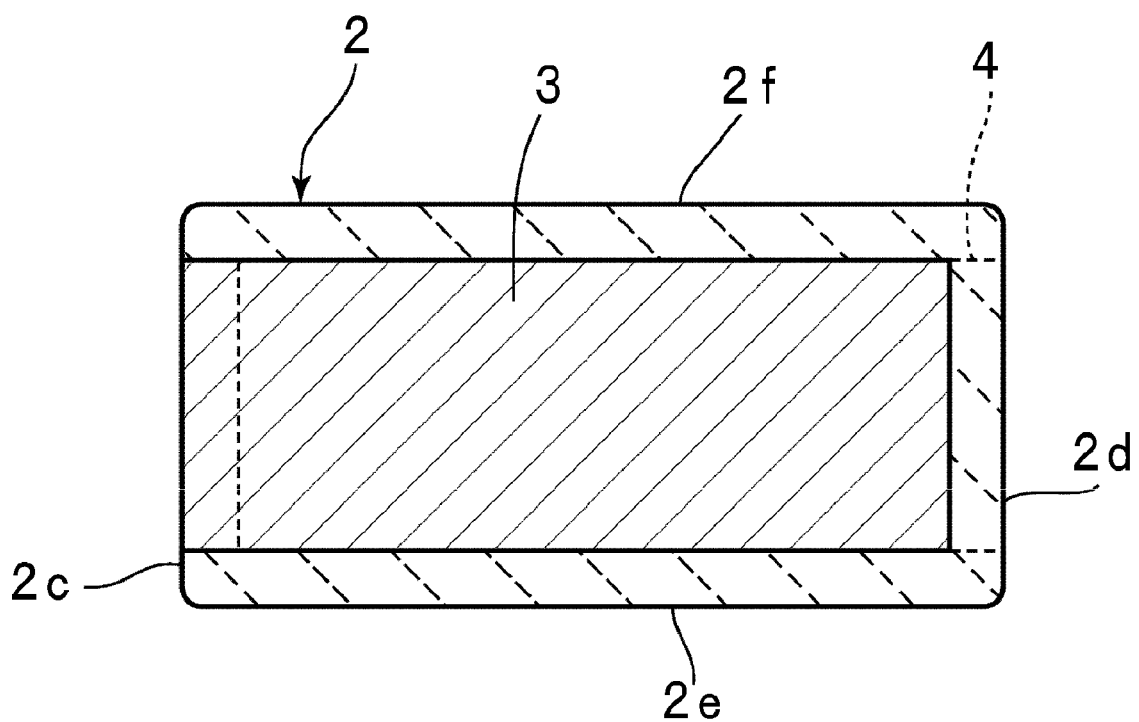
FIG. 2 is a cross-sectional plan view of a ceramic sinter as an electronic component main body and for use in describing an internal electrode shape of the electronic component according to the first preferred embodiment of the present invention.

As illustrated in FIG. 2, each of the first internal electrodes 3 and each of the second internal electrodes 4 are arranged so as to overlap each other, and each of the internal electrodes 3 and 4 has a substantially rectangular shape.

A first external terminal electrode 5 and a second external terminal electrode 6 are disposed on the first main surface $2a$ of the ceramic sinter 2. The first external terminal electrode 5 and the second external terminal electrode 6 are opposite to each other such that a gap region G at a substantially central position is disposed therebetween. Each of the first external terminal electrode 5 and the second external terminal electrode 6 preferably has a substantially trapezoidal shape.

The first external terminal electrode 5 has a substantially trapezoidal shape having an upper base $5a$ extending in an edge defined by the first main surface $2a$ and the second side surface $2f$, a lower base $5b$ extending in an edge defined by the first main surface $2a$ and the first side surface $2e$, and an oblique side $5c$ facing the gap region G. Because the first main surface $2a$ has a substantially rectangular shape, a remaining side $5d$ extends along the width direction.

The second external terminal electrode 6 has a similar shape. The second external terminal electrode 6 has an upper base $6a$ extending in an edge formed by the first main surface $2a$ and the first side surface $2e$, a lower base $6b$ extending in an edge formed by the first main surface $2a$ and the second side surface $2f$, an oblique side $6c$ extending along the gap region G, and a remaining side $6d$ extending along an edge defined by the first main surface $2a$ and the second end surface $2d$.

The oblique side $5c$ of the first external terminal electrode 5 and the oblique side $6c$ of the second external terminal electrode 6 are substantially parallel to each other. That is, the gap region G has a substantially parallelogram shape. The first external terminal electrode 5 and the second external terminal electrode 6 have substantially the same area.

As illustrated in FIG. 1B, a first external terminal electrode 5A having a similar shape to the first external terminal electrode 5 and a second external terminal electrode 6A having a similar shape to the second external terminal electrode are disposed on the second main surface $2b$ of the ceramic sinter 2. It is noted that the gap region G on the first main surface $2a$ and the gap region G on the second main surface $2b$ are arranged so as to cross each other when the ceramic sinter 2 is seen in plan view. That is, the first and second external terminal electrodes 5A and 6A have upper bases and lower bases whose positions are opposite to those of the first and second external terminal electrodes 5 and 6, respectively.

The first and second external terminal electrodes 5A and 6A first external terminal electrode 5A and the second external terminal electrode 6A may also be disposed so as to overlap the first and second external terminal electrodes 5 and 6 disposed on the first main surface $2a$, respectively, when the ceramic sinter 2 is seen in plan view.

In the present preferred embodiment, a first connection electrode 5B to electrically connect the first external terminal electrode 5 and the first external terminal electrode 5A is disposed so as to cover the first end surface $2c$, and a second connection electrode 6B for electrically connecting the second external terminal electrode 6 and the second external terminal electrode 6A is disposed so as to cover the second end surface $2d$. The first connection electrode 5B extends to the first end surface $2c$ and is electrically connected to the first internal electrode 3, and the second connection electrode 6B extends to the second end surface $2d$ and is electrically connected to the second internal electrode 4. The first and second connection electrodes 5B and 6B may also be disposed so as to circle around the first and second side surfaces $2e$ and $2f$.

Figure 6A:
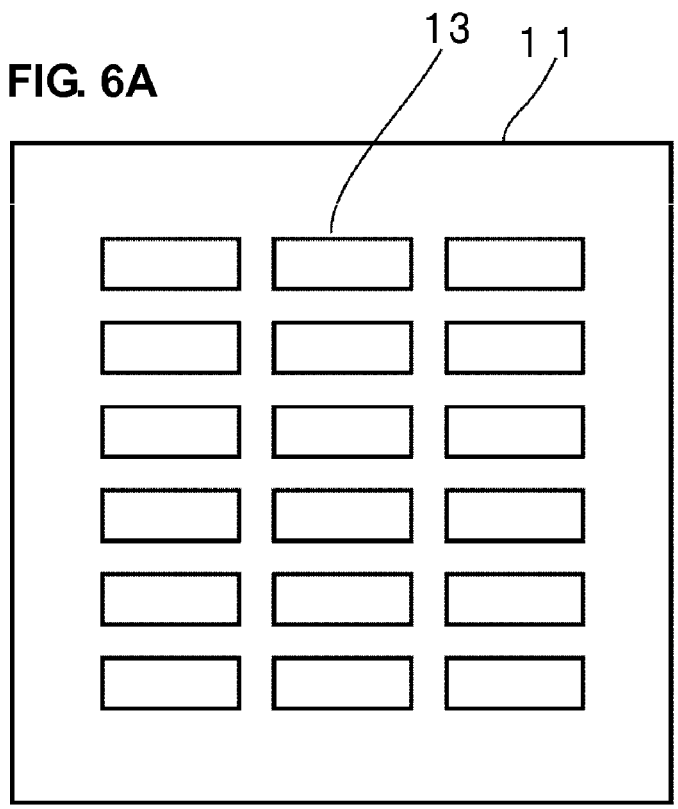
FIGS. 6A and 6B are plan views that illustrate mother green sheets prepared for production of a multilayer ceramic capacitor according to the first preferred embodiment of the present invention.
Figure 6B:
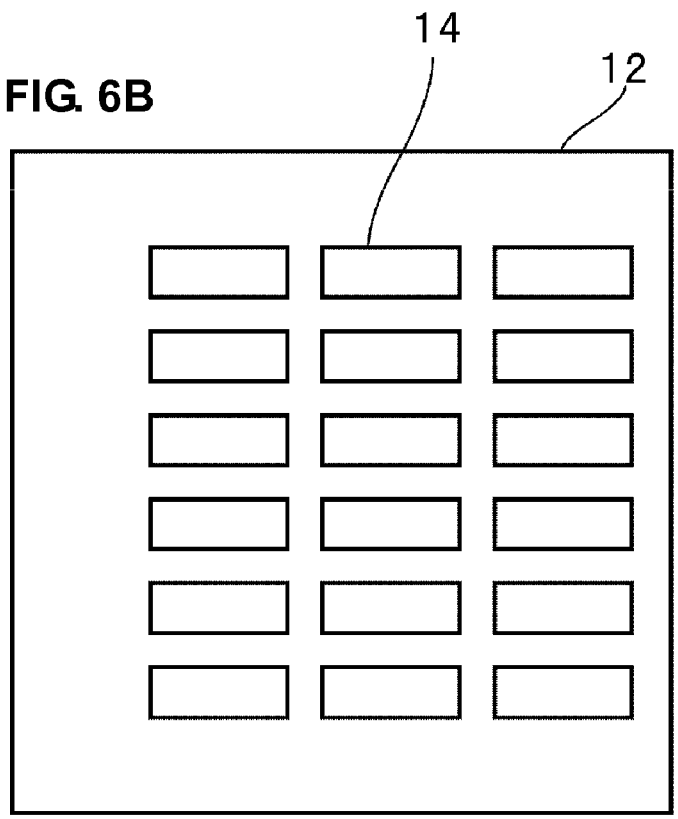

In production, the ceramic sinter 2 is obtainable by a well-known method for making a multilayer ceramic electronic component. That is, ceramic green sheets made of dielectric ceramic, for example, barium titanate ceramic are prepared. Internal electrode paste, for example, Ag—Pd paste is applied by screen printing on the top surface of the ceramic green sheets to prepare first and second mother green sheets 11 and 12 illustrated in FIGS. 6A and 6B. The first mother green sheet 11 has an internal electrode pattern 13 printed thereon, and the second mother green sheet 12 has an internal electrode pattern 14 printed thereon. Desired numbers of the first mother green sheets 11 and the second mother green sheets 12 are alternately stacked, and an illustrated mother ceramic green sheet is stacked on each of the top and the bottom to obtain a mother laminated structure. In such a way, a mother laminated structure 15 illustrated in FIG. 7 is obtainable. Then, as illustrated in FIG. 7, mother external electrodes 16 are preferably formed on the top surface of the mother laminated structure 15 by printing. The mother external electrodes 16 are also formed on the bottom surface of the mother laminated structure 15. Then, the mother laminated structure 15 is cut along the illustrated broken lines into laminated structure segments each corresponding to an individual ceramic capacitor and the segments are sintered. In such a way, the ceramic sinter 2 having the first and second external terminal electrodes 5 and 6 and the first and second external terminal electrodes 5A and 6A is obtainable.

After that, conductive paste is applied so as to extend from the first and second end surfaces 2c and 2d to the first and second main surfaces 2a and 2b and baked. In this way, the first and second external terminal electrodes 5 and 6 and the first and second external terminal electrodes 5A and 6A and the first and second connection electrodes 5B and 6B can be formed. Through the above process, the multilayer ceramic capacitor 1 is obtainable. The first and second external terminal electrodes 5 and 6 and the first and second external terminal electrodes 5A and 6A and the first and second connection electrodes 5B and 6B may also be formed by application of conductive paste on the outer surface of a ceramic element in advance of sintering of the ceramic sinter 2 and then baking simultaneous with the sintering of the ceramic sinter 2.

The first and second external terminal electrodes 5 and 6 may also be formed by an electrode forming method other than printing and baking of conductive paste performed after the obtainment of the ceramic sinter 2.

Figure 3:
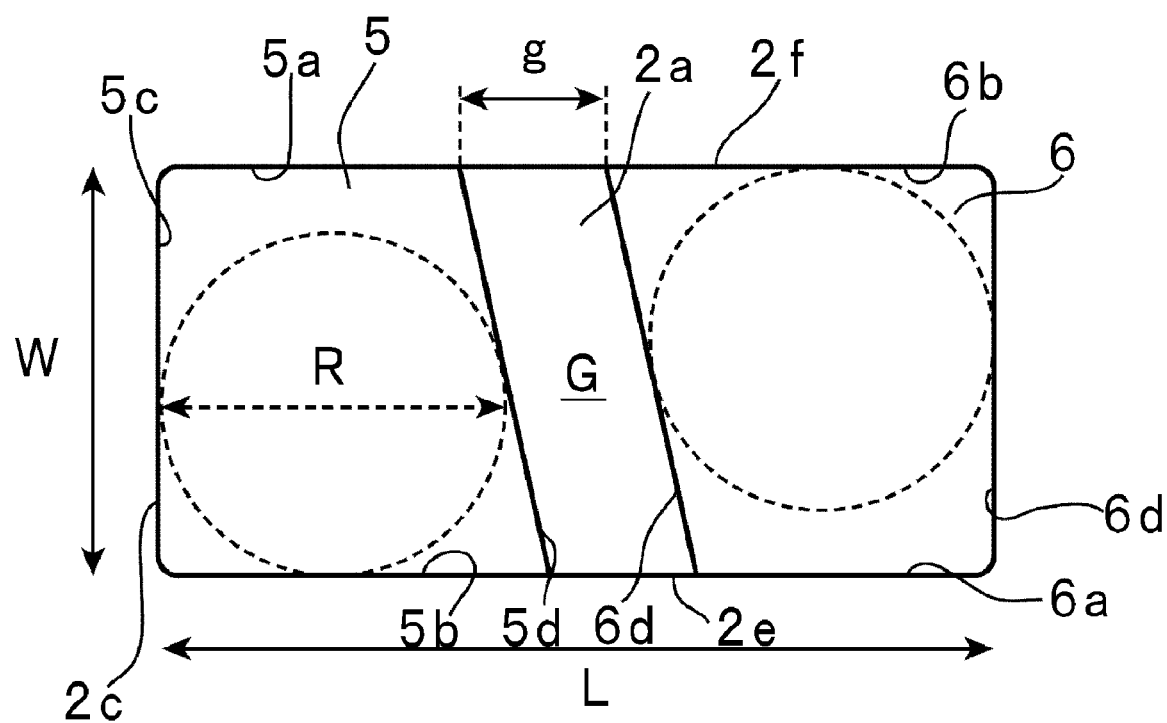
FIG. 3 is a schematic plan view for use in describing a shape of each of first and second external terminal electrodes on a first main surface of an electronic component main body of a ceramic capacitor as the electronic component according to the first preferred embodiment of the present invention.

As illustrated in FIG. 3, in the multilayer ceramic capacitor 1 according to the present preferred embodiment, the first and second external terminal electrodes 5 and 6 are arranged with the gap G disposed therebetween on the first main surface 2a. When the dimension of the ceramic sinter 2 along the longitudinal direction is L, the dimension of the ceramic sinter 2 in the width direction is W, and the opposite distance of the gap G is g, the multilayer ceramic capacitor 1 satisfies the following expressions (1) and (2):

$$W < L-g < 2W \quad (1)$$

$$L-g+W-\{2(L-g)W\}^{1/2} > (L-g)/2 \quad (2)$$

This can increase tolerance for radiation of a laser beam in forming a via hole by emitting the laser beam from outside a substrate in which the multilayer ceramic capacitor 1 is embedded, the substrate being described below. Alternatively, a laser beam having a larger radiation diameter can be emitted.

The details of the increase in tolerance for a position of radiation of a laser beam in forming a via hole described above due to the multilayer ceramic capacitor 1 formed and constructed so as to satisfy the above expressions (1) and (2) are described more specifically below.

In FIG. 3, the substantially circular shape being the radiation region in radiating each of the first and second external terminal electrodes 5 and 6 with a laser beam is indicated by the broken line. When each of the first and second external terminal electrodes 5 and 6 is radiated with the laser beam substantially perpendicular to each of the first and second external terminal electrodes 5 and 6, the radiation region is substantially circular.

Among substantially circular shapes within each of the first and second external terminal electrodes 5 and 6 having a substantially trapezoidal shape, the maximum substantially circular shape is the substantially circular shape having the diameter R illustrated in FIG. 3. That is, for the first external terminal electrode 5, which has the lower base 5b extending along the edge defined by the first main surface 2a and the first side surface 2e, the substantially circular shape having the maximum diameter R is along that edge and is in contact with the side adjacent to the first end surface 2c and the above-described oblique side.

Similarly, for the second external terminal electrode 6, the substantially circular shape having the maximum diameter R is along the edge being the lower base 6b formed by the first main surface 2a and the second side surface 2f and is in contact with the above-described oblique side and the side opposite to that oblique side.

Figure 4:
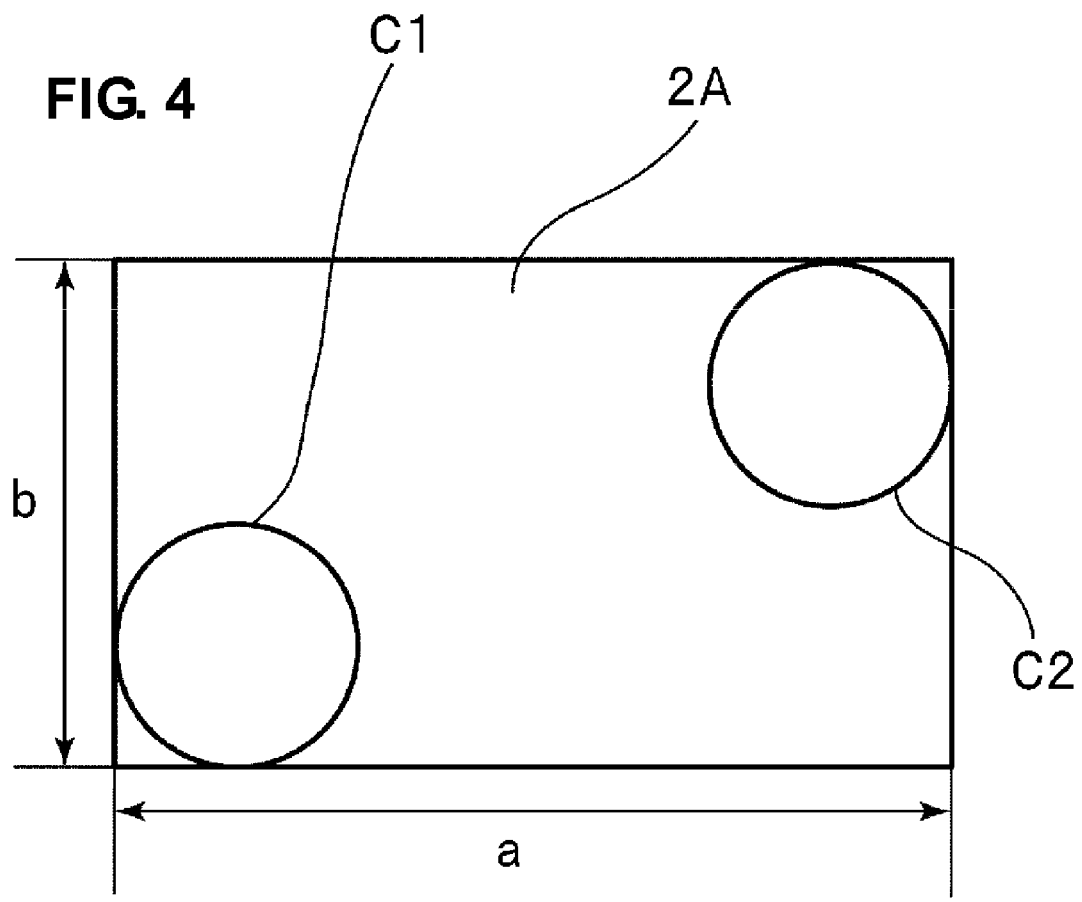
FIG. 4 is a schematic plan view for use in describing a virtual first main surface used for forming an external terminal electrode according to the first preferred embodiment of the present invention.

FIG. 4 illustrates a substantially rectangular first main surface 2A. The first main surface 2A has a shape in which the gap region G is removed from the first main surface 2a illustrated in FIG. 3 and the region where the first external terminal electrode 5 is disposed and the region where the second external terminal electrode 6 is disposed are butt-jointed. In FIG. 4, for the sake of simplification of the description, roundness of the corners of the first main surface is omitted.

In FIG. 4, when the dimension along the longitudinal direction is "a" and the dimension along the width direction is "b," a=L−g and b=W.

In FIG. 4, two substantially circular shapes C1 and C2 within the first main surface 2A are illustrated. The substantially circular shapes C1 and C2 have substantially the same area. The substantially circular shape C1 is arranged in contact with two sides of the first main surface 2A at a first corner portion. The substantially circular shape C2 is arranged in contact with two sides of the first main surface 2A at a second corner portion being diagonally opposite to the first corner portion.

Figure 5:
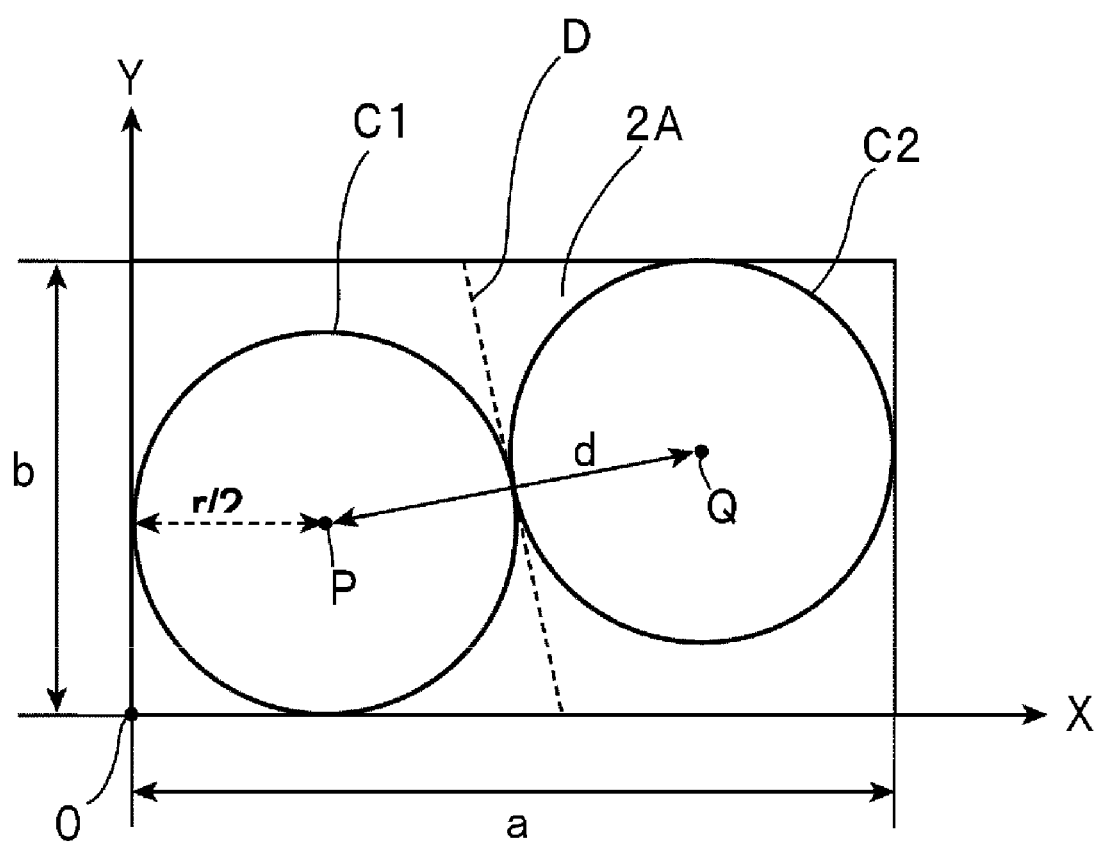
FIG. 5 is a schematic plan view that illustrates a state in which a substantially circular shape having a maximum diameter is formed on the virtual first main surface discussed in forming an external terminal electrode according to the first preferred embodiment of the present invention.

If the area of each of the substantially circular shapes C1 and C2 is increased, when each of them is in contact with the longer side and the shorter side of the substantially rectangular first main surface 2A and they are in contact with each other, as illustrated in FIG. 5, the area of each of them is the largest as long as they do not overlap each other.

At this time, to divide the first main surface 2A into two at a section in contact with both of the substantially circular shapes C1 and C2, the first main surface 2A can be divided at the broken line D illustrated in FIG. 5. That is, the broken line D corresponds to the oblique side of the substantially trapezoidal shape of each of the first and second external terminal electrodes 5 and 6. In other words, the first and second external terminal electrodes 5 and 6 according to the first preferred embodiment can be formed by formation of the gap region G at a region containing the broken line D and arranging the first and second external terminal electrodes at opposite sides of the gap region G.

The dimensions of each portion are discussed next. Because the first main surface 2A is substantially regular rectangular, a>b. If a=b, a figure in which the first and second external terminal electrodes 5 and 6 are butt-joined is not substantially regular rectangular, but substantially square. This case is not preferable in that, because the tangential line to the two substantially circular shapes reaches diagonal vertices of the substantially square shape, each of the external terminal electrodes formed by the division has a substantially triangular shape.

Also, in order to obtain sufficient fixation of the first and second external terminal electrodes 5 and 6 with respect to the ceramic sinter, it is preferable that each of the first and second external terminal electrodes 5 and 6 reach many edges of the ceramic sinter 2, i.e., that it have a substantially trapezoidal shape.

In the present preferred embodiment, a<2b. If a is equal to or larger than 2b, substantially circular shapes having the diameter b can be aligned in the longitudinal direction on the first main surface 2A, which has a substantially regular rectangular shape. This configuration corresponds to that in the known example. Accordingly, in this case, tolerance for a radiation region of a laser beam cannot be increased.

In FIG. 5, to maximize the area of each of the two substantially circular shapes, it is necessary that the diameter r of each of the substantially circular shapes C1 and C2 be larger than a/2, which is the longest diameter in the known example. When the lower-left corner of the substantially regular rectangular shape is the origin O, the coordinates of the center P is (r/2, r/2), and the coordinates of the center Q is (a−r/2, b−r/2).

Accordingly, when the distance between the centers P and Q is d, d=r and the following expression (3) is satisfied.

$$d^2 = \{(a-r/2)-r/2\}^2 + \{(b-r/2)-r/2\}^2 \quad (3)$$
$$= (a-r)^2 + (b-r)^2$$

From d=r and the above expression (3), $r=a+b-(2ab)^{1/2}$
Hence, the following expressions are satisfied.

$$r > a/2 \quad (4)$$

and $$a+b-(2ab)^{1/2} > a/2 \quad (5)$$

Here, when a=L−g and b=W are substituted into expression (5), expression (2), $L-g+W-\{2(L-g)W\}^{1/2} > (L-g)/2$, is satisfied.

To find the length of each of the upper base and the lower base of the substantially trapezoidal shape in preparation for design of the first and second external terminal electrodes 5 and 6, the length of the lower base can be calculated using the intersection point of the straight line substantially perpendicular to intersecting the line segment PQ and the x-axis direction illustrated in FIG. 5. The slope of the line segment PQ is (b−r)/(a−r). The slope of the substantially perpendicular line segment is −(a−r)/(b−r). This straight line intersects the coordinates (a/2, b/2), y=−(a−r)/(b−r)(x−a/2) is satisfied. When y=0 is substituted, x=b(b−r)/2(a−r)+a/2. Accordingly, the length of the lower base is b(b−r)/2(a−r)+a/2, and the length of the upper base is −b(b−r)/2(a−r)+a/2. When L, W, and g are substituted into a and b, the length of the lower base is W(W−r)/2(L−g−r)+(L−g)/2 and the length of the upper base is −W(W−r)/2(W−g−r)+(W−g)/2.

When expressions (1) and (2) are satisfied, the size of each of the substantially circular shapes C1 and C2 contained in the first and second external terminal electrodes 5 and 6, respectively, can be maximum. Accordingly, a via hole that reaches each of the first and second external terminal electrodes 5 and 6 can be readily and precisely formed on a substrate in which the multilayer ceramic capacitor 1 is embedded from the outside by radiation of a laser beam. That is, tolerance for a radiation position in radiation of a laser beam can be increased. A via hole can be formed using a laser beam having a larger diameter, so reliability of electrical connection can be enhanced and equivalent series resistance (ESR) can also be reduced.

The material of each of the first and second external terminal electrodes 5 and 6, the first and second external terminal electrodes 5A and 6A, and the first and second connection electrodes 5B and 6B are not limited to a specific one. For example, copper, nickel, silver, palladium, gold, and an alloy of silver and palladium can be used.

It is preferable that the thickness of each of the first and second external terminal electrodes 5 and 6 be about 10 μm to about 50 μm, for example, at the thickest part. If the thickness is less than about 10 μm, a portion of the external terminal electrode may be removed by radiation of a laser beam and the laser beam may reach the ceramic sinter 2. If the thickness exceeds about 50 μm, a laser beam can be reflected efficiently, but the cost is high.

A plating film may be formed on the surface of each of the first and second external terminal electrodes 5 and 6. The material of the plating film is not limited to a specific one. For example, copper, lithium, tin, silver, palladium, gold, and an alloy of any combination of these may be used. The plating film may be composed of a plurality of layers. The thickness of the plating film may preferably be about 1 μm to about 10 μm, for example, for a single layer.

To form a via hole, that is, a through hole by radiating the substrate with a laser beam, as for a electronic component built-in substrate described below, it is necessary for the first and second external terminal electrodes 5 and 6 to reflect the laser beam. In this case, it is preferable that a plating film having excellent reflectivity, such as copper plating, be disposed.

For the first and second external terminal electrodes 5 and 6, a resin layer for use in reducing a stress may be disposed between the main electrode material and the above plating film.

The first internal electrode 3 and the second internal electrode 4 can be formed using appropriate conductive paste. Examples of the material of the conductive paste include nickel, copper, gold, palladium, silver, and an alloy of silver and palladium. The thickness of each of the first and second internal electrodes 3 and 4 is not limited to a specific one. Preferably, it may be about 0.3 μm to about 2.0 μm, for example.

In the present preferred embodiment, the first and second internal electrodes 3 and 4 are disposed within the ceramic sinter 2. Alternatively, the present invention is applicable to an electronic component that has no internal electrode.

Figure 8:
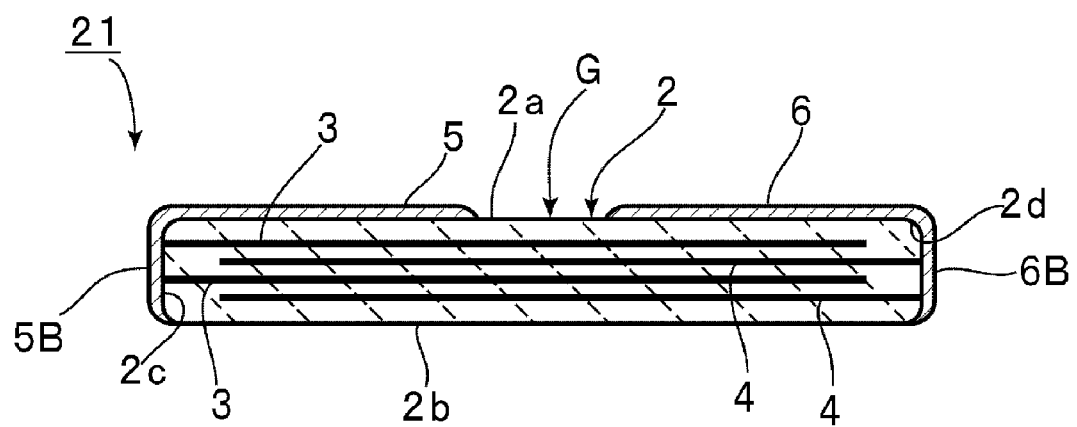
FIG. 8 is a front cross-sectional view that illustrates a multilayer ceramic capacitor as an electronic component according to a modified example of the first preferred embodiment of the present invention.

FIG. 8 is a front cross-sectional view that illustrates an electronic component 21 according to a modified example of the multilayer ceramic capacitor 1 of the first preferred embodiment. In the first preferred embodiment, the first and second external terminal electrodes 5A and 6A are disposed on the second main surface 2b. In contrast, in the electronic component 21 according to the present modified example, neither the first external terminal electrode nor the second external terminal electrodes is disposed on the second main surface 2b. The provision of the first and second external terminal electrodes 5 and 6 on only the first main surface 2a can further reduce the thickness of the multilayer ceramic capacitor 1.

In the first preferred embodiment, because the first and second external terminal electrodes are disposed on both of the first main surface 2a and the second main surface 2b, no orientation can be required. That is, in a state where an electronic component is embedded in a substrate, a via hole can be formed from both of the first main surface 2a side and the second main surface 2b side by radiation of a laser beam. Accordingly, in terms of simplification of a production process, the first preferred embodiment is preferable.

Figure 9:
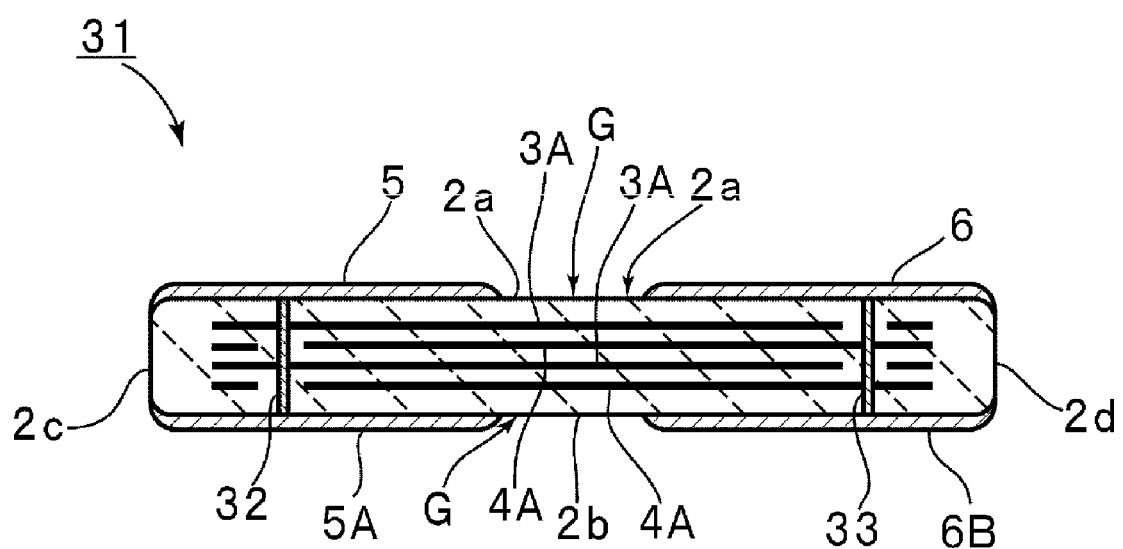
FIG. 9 is a front cross-sectional view that illustrates a multilayer ceramic capacitor according to a second preferred embodiment of the present invention.

FIG. 9 is a front cross-sectional view that illustrates an electronic component according to a second preferred embodiment of the present invention. In an electronic component 31 according to the second preferred embodiment, first internal electrodes 3A and second internal electrodes 4A do not reach the first and second end surfaces 2c and 2d, respectively. Instead, a first via-hole conductor 32 for electrically connecting the first internal electrodes 3A is disposed. The first via-hole conductor 32 connecting the first internal electrodes 3A passes through the ceramic sinter 2 so as to reach the first and second main surfaces 2a and 2b of the ceramic sinter 2. Each of the second internal electrodes 4A has an opening larger than the first via-hole conductor 32. The opening serves to prevent the second internal electrode 4A from being electrically connected to the first via-hole conductor 32.

Similarly, a second via-hole conductor 33 electrically connected to the second internal electrodes 4A passes through the ceramic sinter 2 so as to reach the first and second main surfaces 2a and 2b of the ceramic sinter 2. The second via-hole conductor 33 is not electrically connected to the first internal electrodes 3A.

The first internal electrodes 3A are electrically connected to one another using the first via-hole conductor 32, and the second internal electrodes 4A are electrically connected to one another using the second via-hole conductor 33. Accordingly, the first and second connection electrodes 5B and 6B in the first preferred embodiment are not disposed. In the other respects, the electronic component 31 is substantially the same as the multilayer ceramic capacitor 1.

Also in the present preferred embodiment, the second internal electrode first and second external terminal electrodes 5 and 6 are disposed on the first main surface 2a, and the first and second external terminal electrodes 5A and 6A are disposed on the second main surface 2b. Accordingly, as in the case of the first preferred embodiment, tolerance for a radiation position in radiation of a laser beam can be increased. A laser beam having a larger diameter can be used, so a larger via hole can be formed, reliability of electrical connection can be enhanced, and ESR can also be reduced.

Figure 10A:
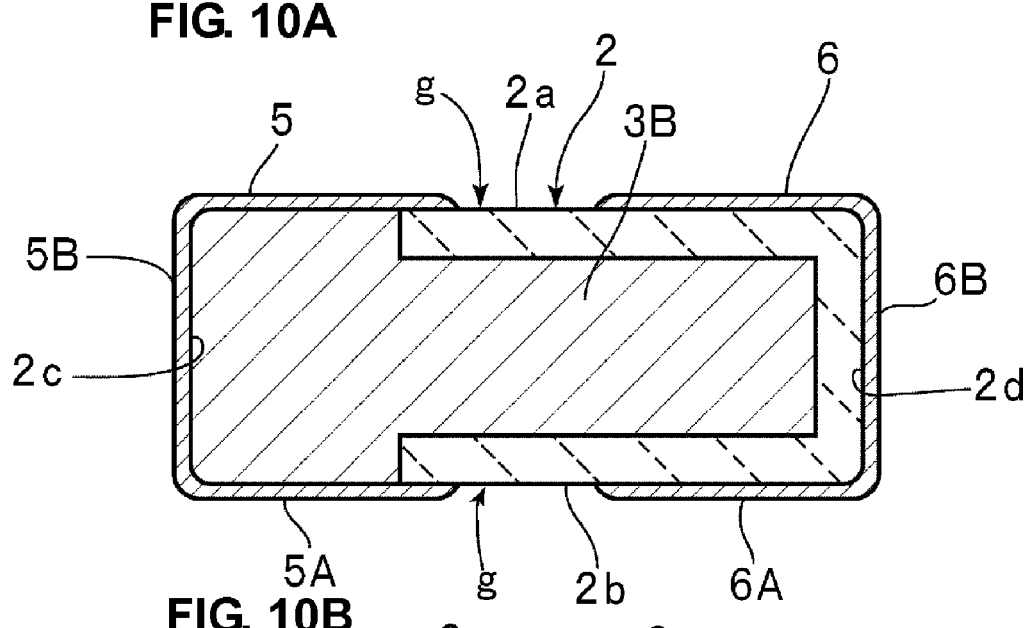
FIGS. 10A and 10B are front cross-sectional views of a multilayer ceramic capacitor according to another modified example of the electronic component according to the first preferred embodiment.
Figure 10B:
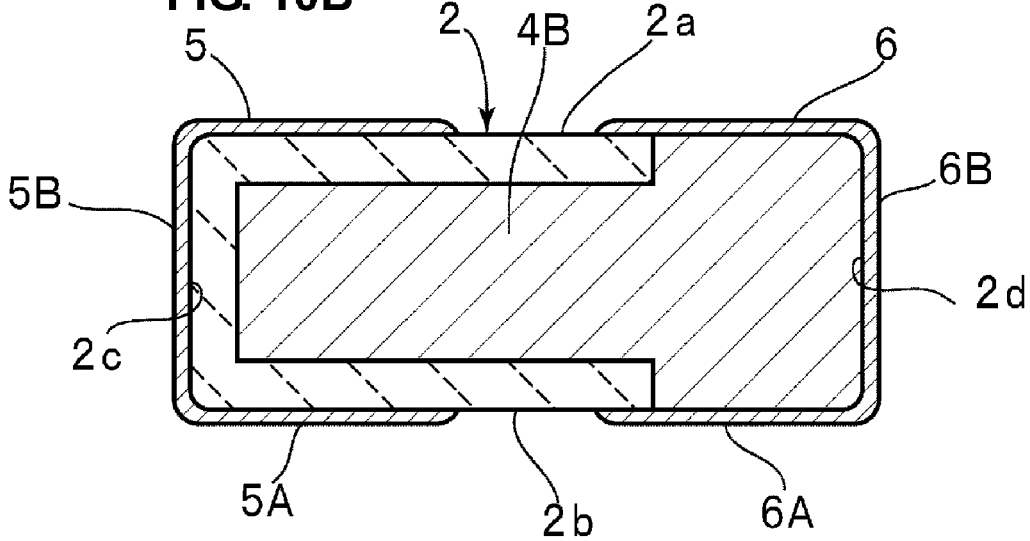

FIGS. 10A and 10B are front cross-sectional views for use in describing another modified example of the multilayer ceramic capacitor 1 according to the first preferred embodiment. In the multilayer ceramic capacitor 1 according to the first preferred embodiment, the plurality of first and second internal electrodes 3 and 4 within the ceramic sinter 2 are arranged in planes substantially parallel with the first and second main surfaces 2a and 2b. In contrast, in the present modified example, as illustrated in FIG. 10A, first internal electrodes 3B are positioned within a plane that contains a plane linking the first and second main surfaces 2a and 2b, i.e., that contains a plane in the thickness direction of the ceramic sinter 2. Second internal electrodes 4B illustrated in FIG. 10B are similar to the first internal electrode 3B.

That is, the plurality of first and second internal electrodes 3B and 4B are positioned within a plane substantially perpendicular to the second main surface being the lower surface of the ceramic sinter 2. In such a manner, the plurality of first and second internal electrodes 3B and 4B may extend in a direction substantially perpendicular to the first and second main surfaces 2a and 2b and be stacked in a direction that links the first and second side surfaces 2e and 2f (see FIG. 1A) with a ceramic layer disposed therebetween.

Figure 11:
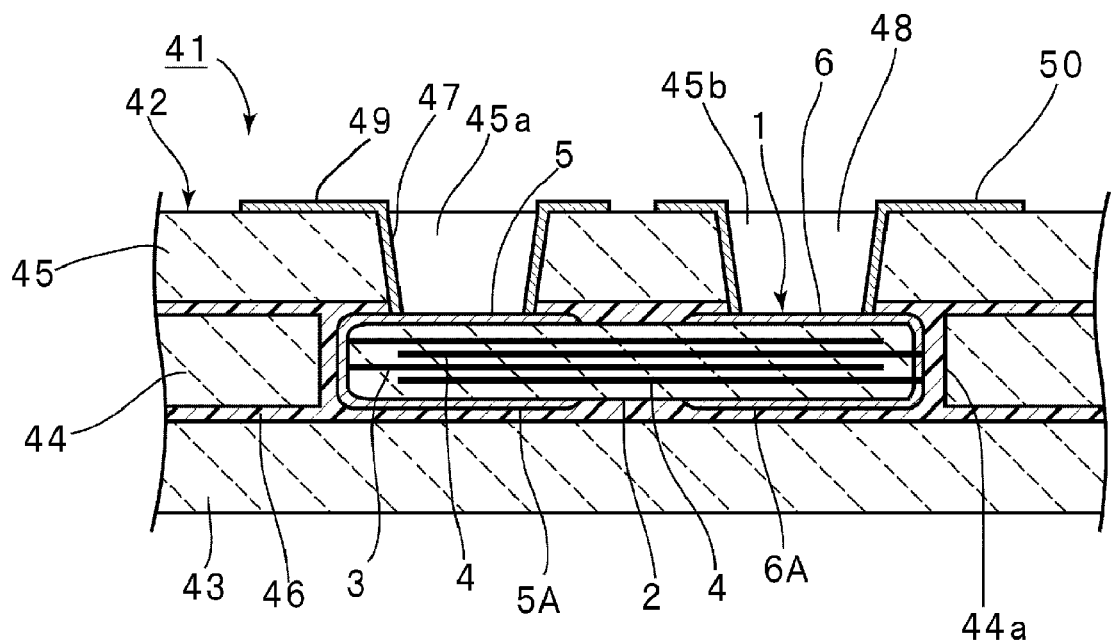
FIG. 11 is a front cross-sectional view for use in describing an electronic component built-in substrate according to a preferred embodiment of the present invention.
Figure 12:
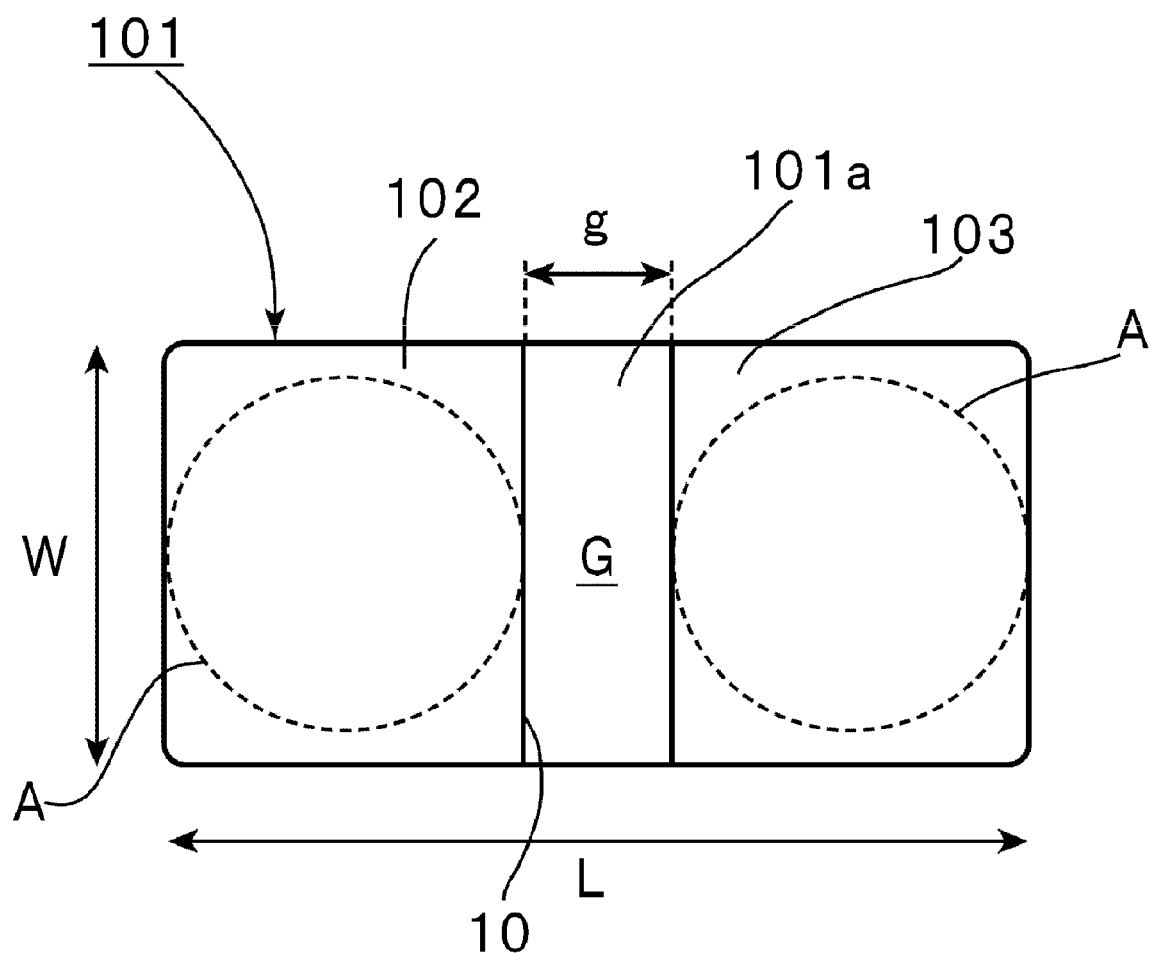
FIG. 12 is a plan view for describing a diameter of an external terminal electrode in a known electronic component.

FIG. 11 is a front cross-sectional view that illustrates an electronic component built-in substrate in which the multilayer ceramic capacitor 1 of the first preferred embodiment is embedded according to a preferred embodiment.

An electronic component built-in substrate 41 according to the present preferred embodiment includes a substrate 42. The substrate 42 is obtained by stacking first to third substrate bases 43 to 45 in this order. That is, the second substrate base and the third substrate base 45 are bonded to the first substrate base 43 with a resin layer 46, and the integrated first to third substrate bases 43 to 45 are formed as the substrate 42.

Each of the first to third substrate bases 43 to 45 can be made of an insulating material, such as an insulating ceramic (e.g., alumina) or a synthetic resin. The insulating resin layer can be made of an insulating resin material, for example, epoxy resin based adhesive.

The second substrate base 44 includes an opening 44a in which the multilayer ceramic capacitor 1 according to the above-described preferred embodiment can be accommodated. In the opening 44a, the multilayer ceramic capacitor 1 as an electronic component is accommodated.

The third substrate base 45 placed on the second substrate base 44 includes through holes 45a and 45b. Via-hole electrodes 47 and 48 are provided on the inner surfaces of the through holes 45a and 45b, respectively, by application of a conductive material thereon.

The via-hole electrodes 47 and 48 are electrically connected to leads 49 and 50 of the substrate 42, respectively, and are also electrically connected to the exposed first and second external terminal electrodes 5 and 6, respectively, at the innermost portions.

In production, the first and second substrate bases 43 and 44 are stacked, the multilayer ceramic capacitor 1 is accommodated in the opening 44a of the second internal electrode 4, and the third substrate base 45 is placed. In this stage, the through holes 45a and 45b are not formed yet.

After that, a laser beam, for example, a $CO_2$ laser is emitted from above the third substrate base 45 to form the through holes 45a and 45b. Then, a conductive material is applied on the inner surface of each of the through holes 45a and 45b, and the via-hole electrodes 47 and 48 are thus formed.

For the electronic component built-in substrate 41 according to the present preferred embodiment, because the first and second external terminal electrodes 5 and 6 of the multilayer ceramic capacitor 1 are formed in the above-described way, tolerance for a radiation position in radiation of a laser beam is increased. That is, a portion of the first main surface 2a being the upper surface of the multilayer ceramic capacitor 1 where the first and second external terminal electrodes 5 and 6 are not formed can be reliably prevented from being radiated with a laser beam. A laser beam having a larger diameter than that of a known equivalent electronic component can be used. Accordingly, the through holes 45a and 45b can have a larger diameter, so reliability of electrical connection can be increased, and ESR can also be reduced.

In the present preferred embodiment, a $CO_2$ laser is preferably used as a laser beam. However, other gas lasers and solid lasers may also be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   an electronic component main body including opposed first and second main surfaces, opposed first and second side surfaces, and opposed first and second end surfaces;
   a first external terminal electrode disposed on the first main surface of the electronic component main body; and
   a second external terminal electrode disposed on the first main surface of the electronic component main body, the first external terminal electrode and the second external terminal electrode being spaced apart by a gap region disposed therebetween; wherein
   each of the first external terminal electrode and the second external terminal electrode has a substantially trapezoidal shape having an upper base, a lower base, an oblique side facing the gap region on the first main surface;
   the oblique side facing the gap region of the first external terminal electrode and the oblique side facing the gap region of the second external terminal electrode are substantially parallel with each other; and
   when a dimension in a longitudinal direction being a direction linking the first and second end surfaces of the electronic component main body is L, a dimension in a width direction being a direction linking the first and second side surfaces is W, and a dimension of the gap region along the longitudinal direction is g, $W<L-g<2W$ and $L-g+W-\{2(L-g)W\}^{1/2}>(L-g)/2$ are satisfied.

2. The electronic component according to claim 1, wherein the upper base and the lower base of the substantially trapezoidal shape of each of the first and second external terminal electrodes on the first main surface extend along an edge between the first main surface and the first side surface and an edge between the first main surface and the second side surface, respectively, and a remaining side of the substantially trapezoidal shape other than the upper base, the lower base, and the oblique side facing the gap region extends in an edge between the first main surface and one of the first and second end surfaces.

3. The electronic component according to claim 1, further comprising an internal electrode disposed within the electronic component main body and electrically connected to at least one of the first external terminal electrode and the second external terminal electrode.

4. The electronic component according to claim 3, wherein the internal electrode comprises a first internal electrode connected to the first external terminal electrode and a second internal electrode connected to the second external terminal electrode.

5. The electronic component according to claim 4, further comprising a first connection conductor arranged to electrically connect the first internal electrode and the first external terminal electrode and a second connection conductor arranged to electrically connect the second internal electrode and the second external terminal electrode.

6. The electronic component according to claim 1, wherein the first and second external terminal electrodes are also disposed on the second main surface of the electronic component main body, and a portion of the first and second external terminal electrodes on the second main surface has substantially the same shape as that on the first main surface.

7. The electronic component according to claim 1, wherein each of the first and second external terminal electrodes does not have the substantially trapezoidal shaped electrode portion on the second main surface of the electronic component main body, and the substantially trapezoidal shaped electrode portion is disposed on only the first main surface.

8. An electronic component built-in substrate comprising:
   an electronic component according to claim 1; and
   a substrate including a first main surface and a second main surface opposing the first main surface, the electronic component being accommodated in the substrate,
   wherein the substrate includes a through hole extending from one of the first main surface and the second main surface along a thickness direction linking the first and second main surfaces of the substrate,
   the through hole is disposed such that at least one of the first and second external terminal electrodes of the electronic component is exposed, and
   the substrate further includes a via-hole conductor reaching the through hole from one of the first and second main surfaces of the substrate, the via-hole conductor being electrically connected to at least one of the first and second external terminal electrodes.

9. The electronic component according to claim 1, wherein the electronic component main body is made of a sintered ceramic material; and
   the first and second external terminal electrodes are made of a conductive paste that is disposed on the first main surface of the electronic component main body in advance of sintering the ceramic material of the electronic component main body such that the conductive paste is baked simultaneously with the sintering of the ceramic material of the electronic component main body.

10. The electronic component according to claim 1, wherein each of the first and second external terminal electrodes is made of one of copper, nickel, silver, palladium, gold, or an alloy of silver and palladium.

11. The electronic component according to claim 1, wherein a copper plating film is provided on a surface of each of the first and second external terminal electrodes.

12. The electronic component according to claim 1, wherein
   a plating film including at least one layer is provided on a surface of each of the first and second external terminal electrodes; and
   a thickness of each of the at least one layer of the plating film is about 1 μm to about 10 μm.

13. The electronic component according to claim 1, wherein a thickness of each of the first and second external terminal electrodes is about 10 μm to about 50 μm at a thickest portion thereof.

14. The electronic component according to claim 4, wherein each of the first and second internal electrodes has a substantially T-shaped configuration.

15. The electronic component according to claim 4, wherein the first internal electrode extends to the first end surface and to both of the opposed first and second side surfaces of the electronic component main body and the second internal electrode extends to the second end surface and to both of the opposed first and second side surfaces of the electronic component main body.

16. The electronic component according to claim 5, wherein each of the first and second connection electrodes is arranged so as to extend to both of the first and second side surfaces of the electronic component main body.

17. The electronic component according to claim 5, wherein the first connection electrode is disposed only on the first end surface of the electronic component main body and the second connection electrode is disposed only on the second end surface of the electronic component main body.

18. The electronic component according to claim 1, wherein a dimension T in a height direction linking the first and second main surfaces is less than the dimension W in the width direction linking the first and second side surfaces.

* * * * *